(12) United States Patent
Boualleg et al.

(10) Patent No.: US 10,850,254 B2
(45) Date of Patent: Dec. 1, 2020

(54) METHOD FOR PREPARING AN ADSORBENT MATERIAL COMPRISING A STEP OF BASIC MIXING, AND METHOD FOR EXTRACTING LITHIUM FROM SALINE SOLUTIONS USING SAID MATERIAL

(71) Applicants: ERAMET, Paris (FR); IFP ENERGIES NOUVELLES, Rueil-Malmaison (FR)

(72) Inventors: Malika Boualleg, Villeurbanne (FR); Fabien André Pierre Burdet, Plaisir (FR); Morgan Julien Florian Gohin, Paris (FR)

(73) Assignees: ERAMET, Paris (FR); IFP ENERGIES NOUVELLES, Rueil-Malmaison (FR)

( * ) Notice: Subject to any disclaimer, the term of this patent is extended or adjusted under 35 U.S.C. 154(b) by 8 days.

(21) Appl. No.: 15/778,768

(22) PCT Filed: Nov. 24, 2016

(86) PCT No.: PCT/EP2016/078715
§ 371 (c)(1),
(2) Date: May 24, 2018

(87) PCT Pub. No.: WO2017/089486
PCT Pub. Date: Jun. 1, 2017

(65) Prior Publication Data
US 2018/0345244 A1  Dec. 6, 2018

(30) Foreign Application Priority Data
Nov. 24, 2015 (FR) .................... 15 61312

(51) Int. Cl.
*B01J 20/04* (2006.01)
*B01J 20/30* (2006.01)
(Continued)

(52) U.S. Cl.
CPC ....... *B01J 20/041* (2013.01); *B01J 20/28014* (2013.01); *B01J 20/3007* (2013.01);
(Continued)

(58) Field of Classification Search
CPC ............... B01J 20/041; B01J 20/28014; B01J 20/3007; B01J 20/3071; C01D 15/00; C01F 7/002; C01F 7/004; C01F 7/025
See application file for complete search history.

(56) References Cited

U.S. PATENT DOCUMENTS 4,348,297 A   9/1982  Bauman et al.
4,540,509 A * 9/1985  Burba, III ............... B01J 41/10
                                              252/184

(Continued)

FOREIGN PATENT DOCUMENTS

CL   2016002663    1/2017
CN      1243112    2/2000
(Continued)

OTHER PUBLICATIONS

Preliminary Search Report for FR 1561312, dated Jul. 25, 2016.
(Continued)

*Primary Examiner* — James A Fiorito
(74) *Attorney, Agent, or Firm* — B. Aaron Schulman, Esq.; Stites & Harbison, PLLC

(57) ABSTRACT

The present invention relates to the field of solid materials for the adsorption of lithium. In particular, the present invention relates to a new method for the preparation of a crystallized and shaped solid material, preferably in extruded form, of formula $LiX_x \cdot 2Al(OH)_3 \cdot nH_2O$, wherein n (Continued)

is between 0.01 and 10, x is 1 when X is an anion selected from among chloride, hydroxide and nitrate anions, and x is 0.5 when X is an anion selected from among sulfate and carbonate anions, comprising a boehmite precipitation step a) under specific temperature and pH conditions, at least one basic mixing shaping step, wherein the method also comprises a final hydrothermal treatment step, all to increase the lithium adsorption capacity and the kinetics of adsorption of the materials obtained, compared with the materials of the prior art when it is used in a method for lithium extraction from saline solutions.

10 Claims, 3 Drawing Sheets

(51) Int. Cl.
*C01F 7/00* (2006.01)
*C01F 7/02* (2006.01)
*C01D 15/00* (2006.01)
*B01J 20/28* (2006.01)

(52) U.S. Cl.
CPC .......... *B01J 20/3071* (2013.01); *C01D 15/00* (2013.01); *C01F 7/002* (2013.01); *C01F 7/004* (2013.01); *C01F 7/025* (2013.01); *B01J 2220/58* (2013.01); *C01F 7/02* (2013.01); *C01P 2002/72* (2013.01)

(56) References Cited

U.S. PATENT DOCUMENTS

| | | |
|---|---|---|
| 6,280,693 B1 | 8/2001 | Bauman et al. |
| 8,753,594 B1 | 6/2014 | Burba et al. |
| 2017/0043317 A1 | 2/2017 | Boualleg et al. |

FOREIGN PATENT DOCUMENTS

| | | |
|---|---|---|
| CN | 1511964 | 7/2004 |
| CN | 101829538 | 9/2010 |
| CN | 102872792 | 1/2013 |
| FR | 3015458 | 6/2015 |
| RU | 2234367 | 8/2004 |

OTHER PUBLICATIONS

Written Opinion for FR 1561312, dated Nov. 24, 2015.
International Search Report for PCT/EP2016/078715, dated Dec. 15, 2016.
Written Opinion of the International Searching Authority for PCT/EP2016/078715, dated Dec. 15, 2016.

* cited by examiner

METHOD FOR PREPARING AN ADSORBENT MATERIAL COMPRISING A STEP OF BASIC MIXING, AND METHOD FOR EXTRACTING LITHIUM FROM SALINE SOLUTIONS USING SAID MATERIAL

TECHNICAL FIELD

The present invention relates to the field of solid materials for the adsorption of lithium. In particular, the present invention relates to a new method for the preparation of a crystallized and shaped solid material, preferably in extruded form, of formula $LiX_x.2Al(OH)_3,nH_2O$, wherein n is between 0.01 and 10, and x is 1 when X is an anion selected from among chloride, hydroxide and nitrate anions, and x is 0.5 when X is an anion selected from among sulfate and carbonate anions, comprising a step a) of precipitation of boehmite under specific temperature and pH conditions, at least one basic extrusion-shaping step, wherein the method also comprises a final hydrothermal treatment step, wherein all of the features of the method allow an increase in the mechanical strength and the adsorption capacity of the lithium as well as the adsorption kinetics of the materials obtained when compared with the materials of the prior art when they are used in a method for extraction of lithium from saline solutions.

The present invention also relates to a method for extracting lithium from saline solutions using the crystallized solid material of formula $LiX_x.2Al(OH)_3,nH_2O$, wherein n, x and X having the above definition are prepared according to the new preparation method according to the invention.

PRIOR ART

Lithium ions coexist with massive amounts of metals such as, for example, alkalis, alkaline earths, boron and sulphates, especially in salt solutions such as brines. Thus, they must be extracted economically and selectively from these salt solutions. In fact, the chemical properties of lithium and alkali metals, preferably sodium (Na), and potassium (K) and alkaline earth metals, preferably magnesium (Mg), calcium (Ca) and strontium (Sr), make it difficult to separate these elements.

Solid materials of formula $LiCl.2Al(OH)_3,nH_2O$, wherein n is between 0.01 and 10, are known for their use in the phenomena of adsorption/desorption of lithium ions and, in particular, in methods for extracting lithium from saline solutions. These not very stable structures allow the intercalation of lithium atoms in the structure and thus the extraction of lithium.

Several operating protocols leading to solids capable of selectively adsorbing lithium have been demonstrated in the prior art. In all cases, an aluminum trihydroxide $Al(OH)_3$, prepared or commercially available, is contacted with a lithium precursor. Three main precursors are used: wherein the most used is lithium chloride (LiCl). Aluminum hydroxide (LiOH) or lithium carbonate ($Li_2CO_3$) may also be used.

U.S. Pat. No. 6,280,693 describes a method for preparing a $LiCl/Al(OH)_3$ solid by adding an aqueous solution of LiOH to a polycrystalline hydrated alumina to form $LiOH/Al(OH)_3$, and thus creating lithium sites active in the crystalline layers of alumina without altering its structure. The conversion of $LiOH/Al(OH)_3$ to $LiCl/Al(OH)_3$ is then carried out by adding dilute hydrochloric acid. The alumina pellets thus prepared are then used in a method for extracting lithium from brine at high temperature. The lithium extraction method described in U.S. Pat. No. 6,280,693 uses the solid detailed above and comprises the following steps:
  a) Saturation of a bed of solid by a brine containing a lithium salt LiX, wherein X is chosen from among halides, nitrates, sulphates and bicarbonates,
  b) Displacement of the brine impregnated with a concentrated NaX solution,
  c) Elution of the LiX salt captured by the solid by passage of an unsaturated solution of LiX,
  d) Displacement of the impregnant by a concentrated solution of NaX, wherein the steps a) to d) are then repeated at least once.

The patent RU 2 234 367 describes a method for the preparation of a solid of formula $LiCl.2Al(OH)_3,nH_2O$ comprising a step of mixing aluminum trichloride ($AlCl_3$) and lithium carbonate ($Li_2CO_3$) in the presence of water at 40° C. The residue obtained is filtered and washed and then dried for 4 hours at 60° C. The solid thus obtained is not shaped.

The solid obtained is used for extracting the lithium contained in salt solutions by contacting with water in order to remove a portion of the lithium, wherein it is then placed in contact with a saline solution containing lithium. The static capacity thus obtained is between 6.0 and 8.0 mg of lithium per g of solid.

The patent CN1243112 describes a method for preparing a solid of formula $LiCl.2Al(OH)_3,nH_2O$ comprising a step of precipitation of aluminum hydroxide microcrystals $Al(OH)_3$ by contacting $AlCl_3$ and sodium hydroxide NaOH, then contacting the microcrystals with a 6% solution of lithium chloride LiCl at 80° C. for 2 hours followed by filtration, rinsing and drying to obtain a powder of $LiCl.2Al(OH)_3,nH_2O$ with an unordered and amorphous structure. A solution of a macromolecular polymer chosen from among fluorinated resins, polyvinyl chloride (PVC), chlorinated polyvinyl chloride (CPVC), ethylene perchlorate and cellulose acetate butyrate (CAB) acting as binder, is then mixed with the $LiCl.2Al(OH)_3,nH_2O$ powder to obtain a paste which is then shaped by granulation followed by drying in air.

The use of such a solid in a method for extracting lithium from salt lake brines makes it possible to obtain a low Mg/Li ratio and a mother liquor that is rich in lithium and which complies with the standards for the production of carbonates or chlorides of lithium.

An object of the present invention is to provide a solid material for the selective extraction of lithium from brine, wherein the solid material is of good quality, without apparent defects and has good cohesion and good mechanical strength when it is put in contact with brine solution or put in water.

An object of the present invention is to provide a new method for preparing such a solid material.

Another object of the present invention is to provide a method for extracting lithium from saline solutions using the solid material.

Another object of the present invention is to provide a solid material for carrying out a method for the extraction of lithium from saline solutions, wherein the solid material makes it possible to limit the generation of unwanted fine particles. In fact, the fine particles increase the pressure drop, promote the creation of preferential paths and increase the rate of renewal of the material during the passage of the brine through a bed of the material in a column.

The Applicants have discovered a new method for preparing a crystallized solid material of formula $LiX_x.2Al(OH)_3,nH_2O$ wherein n is between 0.01 and 10, and x is 1 when X is an anion selected from among chloride, hydroxide and nitrate anions, and x is equal to 0.5 when X is an anion chosen from among sulphate and carbonate anions, comprising a specific step combination and, in particular, that the fact of carrying out both step a) of the precipitation of boehmite under specific temperature and pH conditions, the step of shaping a paste, by mixing-extrusion in the presence of a base, following a drying step operating under specific conditions, and then carrying out a final hydrothermal treatment step on the shaped materials, makes it possible to obtain a crystallized solid material of formula $LiX_x.2Al(OH)_3,nH_2O$ without apparent defect, while simultaneously providing good cohesion, good mechanical strength of the material when it is put in contact with a brine solution or put in water, and offering lithium adsorption capacity as well as adsorption kinetics that are improved when compared with materials of the prior art, when these are used in a method for lithium extraction from saline solutions.

Without being bound to any theory, the Applicants have demonstrated that the implementation of step a) of precipitation under the operating conditions of temperatures and pH as defined above, allows the obtaining of a precipitate of boehmite compound of small-sized crystallites. In particular, the precipitate of boehmite thus obtained has a size, as determined by the Scherrer formula in X-ray diffraction according to the crystallographic instructions [020] and [120], that is respectively between 0.5 and 10 nm and 0.5 and 15 nm, and preferably respectively between 0.5 to 2 nm and 0.5 to 3 nm, and very preferably respectively between 0.5 and 1.5 and 0.5 and 2.5.

Scherrer's formula is a formula used in X-ray diffraction on powders or polycrystalline samples which links the width at half height of the diffraction peaks to the size of the crystallites. It is described in detail in reference: Appl. Cryst. (1978). 11, 102-113 Scherrer after sixty years: A survey and some new results in the determination of crystallite size, J. I. Langford and A. J. C. Wilson.

The method according to the invention thus makes it possible to obtain a crystallized solid final material of formula $LiX_x.2Al(OH)_3,nH_2O$, wherein n is between 0.01 and 10, and wherein x, having the above definition, is also poorly crystallized but has lithium adsorption capacity as well as adsorption kinetics that are improved compared to the materials of the prior art when it is used in a method for extracting lithium from saline solutions.

Moreover, the implementation of an extrusion shaping step in the presence of a base used in specific quantities makes it possible to obtain a final material having good cohesion as well as good mechanical strength when it is put in contact with a brine solution or put in water.

SUMMARY AND INTEREST OF THE INVENTION

The term "material of formula $LiX_x.2Al(OH)_3,nH_2O$" is preferably understood to mean a material comprising essentially, or consisting of, a crystallized phase of formula $LiX_x.2Al(OH)_3,nH_2O$, wherein n, x and X have the definition given above.

The object of the present invention is a method for preparing a crystallized solid material of formula $LiX_x.2Al(OH)_3,nH_2O$, wherein n is between 0.01 and 10, and x is equal to 1 when X is an anion chosen from among chloride, hydroxide and nitrate anions, while x is equal to 0.5 when X is an anion chosen from among sulphate and carbonate anions, wherein the method comprises at least the following steps:

a) a step of precipitating boehmite in an aqueous medium, of at least one basic precursor chosen from among sodium aluminate, potassium aluminate, aqueous ammonia, sodium hydroxide and potassium hydroxide; and at least one acid precursor selected from among aluminum sulphate, aluminum chloride, aluminum nitrate, sulfuric acid, hydrochloric acid, and nitric acid, wherein at least one of the basic or acidic precursors comprises aluminum in order to obtain a boehmite suspension, wherein step a) operates at a temperature of between 5 and 35° C., and the amount of the basic precursor is chosen in order to obtain a pH between 7.5 and 9.5 at the end of precipitation in the reaction medium, b) a step of filtering and washing the boehmite precipitate obtained in step a), c) a step of contacting the precipitate obtained in step b) with at least one lithium source, d) a step of filtering the suspension obtained in step c) to obtain a paste, e) a step of drying the paste obtained at the end of step d) at a temperature of between 20 and 80° C. for a duration of preferably between 1 h and 20 h, f) a step of shaping the basic extrusion-mixed dough in which the dried dough resulting from step e) is mixed in the presence of a basic amount of between 0.5 and 3% by weight relative to the dry material, wherein the dry material is the weight of the paste resulting from step e), dried in an oven at 200° C. for 6 h, and wherein the base is chosen from inorganic bases and organic bases in solution, and wherein the paste is then subjected to an extrusion step, g) a step for the hydrothermal treatment of the dried shaped material obtained at the end of step f), at a temperature of between 50 and 200° C. and for a duration of preferably between 30 minutes and 12 hours.

An advantage of the preparation method according to the invention is that it makes it possible to obtain a crystallized solid shaped material, preferably in the form of extrudates, of formula $LiX_x.2Al(OH)_3,nH_2O$, wherein n, x and X having the above definition, have good quality without apparent defects, and offer good cohesion and improved mechanical strength when it is brought into contact with a brine solution or a dilute solution, and preferably put in water.

Another advantage of the present invention is to provide a method for preparing a shaped crystallized solid material, preferably in extruded form, of the formula $LiX_x.2Al(OH)_3,nH_2O$, wherein n, x and X having the above definition, offer a lithium adsorption capacity and adsorption kinetics that are improved compared with the materials of the prior art, when it is used in a method for lithium extraction from saline solutions.

The adsorption capacity of the aforementioned material is defined by the amount of lithium adsorbed for a given solution. It is calculated by persons skilled in the art by integrating the amount of lithium determined from a drilling curve that is also called leakage curve or saturation curve. The integration is carried out on the volume by the difference in lithium concentration between a solution after its charging on the aforementioned material and the theoretical concentration without charging. This amount of material may be related to the amount of material used to obtain a capacity in milligrams of lithium per gram of dry solid.

The adsorption kinetics of the aforementioned material is measured by persons skilled in the art by studying the shape of a drilling curve also called leakage curve or saturation curve. This curve is obtained by means of a column filled with the adsorbent material to form a homogeneous bed, by percolating a saline solution containing lithium, and by measuring the lithium concentration at the outlet of the adsorbent bed as a function of the volume of the solution used for a given flow.

By an adsorption capacity that is improved compared with the materials of the prior art, is understood to mean an adsorption capacity greater than 4.5 mg Li/g of dry solid material.

By dry solid material is meant a solid material dried at 200° C. for 6 hours.

By "shaping" is meant that the material is solid and has sufficient cohesion when the solid is brought into contact with a brine solution so that it does not substantially lose its physical integrity, i.e. it substantially retains its shaping. More specifically, a solid shaped in the sense of the invention describes a solid maintaining its cohesion in the lithium extraction conditions defined in the examples.

The cohesion as well as the mechanical strength of the shaped material, preferably shaped by extrusion and prepared according to the invention are tested during the production of drilling curves, also called leakage curves or saturation curves. A solid material exhibiting good mechanical strength does not produce fine particles and makes it possible to operate the column without any clogging. A solid material having poor mechanical strength produces fine particles which induce clogging of the column.

The cohesion as well as the mechanical strength of the shaped material, preferably shaped by extrusion and prepared according to the invention, are also tested by means of an accelerated aging protocol on a stirring table, either in a brine or in water.

The stirring table is driven by a horizontal unidirectional movement with an amplitude of 4 cm and a speed of 190 movements per minute. The shaped solids are stirred for a total of 330 hours.

At the end of these 330 h, the solid mixture shaped in brine or water is sieved using a grid mesh of 315 µm. Then the shaped solids remaining on the sieve are washed with the medium used during the stirring. The liquid fraction thus obtained, containing fine solid particles (diameter less than 315 µm) in suspension, is filtered using a Büchner equipped with a filter paper whose pores have a dimension of 0.45 µm. The cake formed by agglomeration of the fine particles is washed with deionized water. The solid residue thus obtained is dried in an oven at 200° C. for 6 hours.

The ratio of the mass of solid residue to the initially shaped mass of solids is then calculated, giving access to a percentage of destruction of the shaped solids.

The percentage of destruction of the materials prepared according to the invention makes it possible to assess the cohesion of the materials.

Good cohesion is obtained, in particular, for materials whose percentage of destruction is less than 60%, and preferably less than 50%, when they are brought into contact with a solution of brine or other dilute solutions and, in particular, water.

The materials prepared according to the invention also offer improved mechanical strength compared to materials of the prior art.

"Improved mechanical strength" is understood to mean that the materials prepared according to the invention have a percentage of destruction, when they are brought into contact with a solution of brine or other dilute solutions and, in particular, water, of less than 30% and preferably less than 20%.

Another advantage of the preparation method according to the invention is that it makes it possible to obtain a shaped crystallized solid material, preferably in the form of extrudates, of formula $LiX_x \cdot 2Al(OH)_3 \cdot nH_2O$, wherein n, x and X have the above definition, and they have no or few cracks which could cause swelling that would be detrimental to the cohesion and mechanical strength of the material when it is brought into contact with a brine solution or a dilute solution, and preferably water.

An object of the present invention is also a method for extracting lithium from saline solutions using the shaped crystallized solid material of formula $LiX_x \cdot 2Al(OH)_3 \cdot nH_2O$, wherein n is between 0.01 and 10, and wherein x is equal to 1 when X is an anion chosen from among chloride, hydroxide and nitrate anions, and x is equal to 0.5 when X is an anion chosen from among sulphate and carbonate anions, prepared according to the new preparation method according to the invention or as defined in the invention, for the extraction of lithium from saline solutions.

An advantage of the extraction method according to the invention is to allow the selective extraction of lithium from a saline solution and thus to obtain a high purification factor compared to the initial saline solution, calculated as the X/Li ratio which is equal to the molar ratio of X/Li concentrations in the initial saline solution divided by the molar ratio of X/Li concentrations in the final solution, wherein X is selected from among sodium (Na), potassium (K) magnesium (Mg), calcium (Ca), boron (B), sulfur (S) and strontium (Sr).

An object of the present invention is also a crystallized solid material of formula $LiX_x \cdot 2Al(OH)_3 \cdot nH_2O$, wherein n is between 0.01 and 10, and x is equal to 1 when X is an anion chosen from among chloride, hydroxide, and nitrate anions, and wherein x is equal to 0.5 when X is an anion chosen from among sulphate and carbonate anions, preferably in the form of extrudates and obtainable according to a method of the invention.

The present invention also relates to a device for lithium extraction from saline solution(s). The device according to the invention thus implements the extraction method according to the invention.

DESCRIPTION OF THE INVENTION

According to the invention, the method comprises a step a) of precipitating boehmite in an aqueous reaction medium comprising at least one basic precursor chosen from among sodium aluminate, potassium aluminate, ammonia, sodium hydroxide and potassium hydroxide, and at least one acidic precursor selected from among aluminum sulphate, aluminum trichloride, aluminum nitrate, sulfuric acid, hydrochloric acid, and nitric acid, wherein at least one of the basic or acidic precursors comprises aluminum, in order to obtain a suspension of boehmite, wherein step a) operates at a temperature between 5 and 35° C., and the amount of the basic precursor is chosen in order to obtain a pH at the end of precipitation in the reaction medium of between 7.5 and 9.5.

The mixture in the aqueous reaction medium of at least one basic precursor and at least one acidic precursor requires either that at least the basic precursor or the acidic precursor comprises aluminum, or that the two basic and acidic precursors include aluminum.

Preferably, the basic precursor is sodium hydroxide (NaOH).

Preferably, the acidic precursor is aluminum trichloride ($AlCl_3$).

Preferably, the basic and acidic precursor(s) are added in aqueous solutions in the first precipitation step a).

Preferably, the aqueous reaction medium is water.

Preferably, the step a) operates with stirring.

Preferably, the boehmite precipitation step a) is carried out at a temperature between 5 and 30° C., preferably between 10 and 30° C., and very preferably between 10 and 25° C., while the amount of the basic precursor is chosen in order to obtain a pH of the end of precipitation in the reaction medium of between 7.5 and 9, and preferably between 7.7 and 8.8.

Preferably, the precipitation step a) is carried out for a period of between 10 minutes and 5 hours, preferably between 15 minutes and 2 hours.

The precipitation step a) makes it possible to obtain a suspension of precipitated boehmite or aluminum oxyhydroxide (AlOOH).

The implementation of precipitation step a) under the operating conditions of temperatures and pH as defined above allows the obtaining of a boehmite precipitate having small crystallites. "Small crystallites" are understood to mean a boehmite precipitate composed of crystallites whose size, obtained by Scherrer's X-ray diffraction formula according to the crystallographic instructions [020] and [120], is respectively between 0.5 and 10 nm and between 0.5 and 15 nm, preferably respectively between 0.5 to 2 nm and between 0.5 to 3 nm, and very preferably respectively between 0.5 and 1.5 nm and between 0.5 and 2.5 nm.

According to the invention, the method comprises a step b) of filtration and washing of the boehmite precipitate obtained at the end of step a).

Preferably the washing step is a washing step with water.

According to the invention, the method comprises a step c) of contacting the boehmite precipitate obtained in step b) with at least one lithium source.

The lithium source(s) may be any compound comprising the lithium element and capable of releasing this element in aqueous solution in reactive form. Preferably, the source(s) of lithium is/are chosen from lithium salts and preferably from among lithium chloride (LiCl), lithium hydroxide (LiOH), nitrate of lithium (LiNO$_3$), lithium sulphate (Li$_2$SO$_4$) and lithium carbonate (Li$_2$CO$_3$), alone or as a mixture.

Very preferably, the lithium source is lithium chloride (LiCl). In this case, X is the chloride anion and x=1.

Preferably, the boehmite precipitate obtained in step b) and at least one lithium source are mixed in the presence of water to obtain a suspension in step c). Preferably, the mixing step c) is carried out with vigorous stirring.

Preferably, the contacting step c) is carried out at a temperature of between 20 and 95° C., preferably between 50 and 95° C., more preferably between 70 and 95° C. for a duration of between 15 minutes and 12 hours, preferably between 30 minutes and 5 hours.

According to the invention, the suspension obtained at the end of step c) undergoes a filtration step d) to obtain a paste.

According to the invention, the paste obtained at the end of step d) is dried in a drying step e), preferably at a temperature between 20 and 80° C., more preferably between 30 and 80° C., for a period preferably between 1 h and 20 h, preferably between 1 and 12 h, and more preferably between 1 and 10 h.

Preferably, the drying step is carried out in an oven without a grinding step following the drying step in an oven.

The operating conditions of the drying step e) make it possible to obtain a dried paste with a loss on ignition (LOI) of between 20 and 75%, preferably between 20 and 70%.

The loss on ignition obtained allows the shaping, preferably by extrusion, of the dried paste under good conditions in order to obtain shaped materials, preferably extruded, resistant and without apparent defects, i.e. without cracks.

In order to determine the LOI before the shaping step, a portion of the paste obtained is removed and put in an oven at 200° C. The LOI is obtained by the difference between the mass of the sample before and after passage in the oven.

According to the invention, the dried paste obtained at the end of the drying step e) undergoes a step f) of shaping by basic extrusion mixing, wherein the dried paste resulting from step e) is mixed in the presence of a base quantity of between 0.5 and 3% by weight relative to the dry matter, wherein the dry matter is the weight of the paste resulting from stage e), dried in an oven at 200° C. for 6 hours; and wherein the base is selected from inorganic bases and organic bases in solution, and wherein the paste is then subjected to an extrusion step.

The term "mixing-extrusion step" is understood to mean a step in which the dried paste obtained at the end of the drying step e) undergoes a first mixing step according to the invention, in the presence of a base, and then the paste is subjected to an extrusion step, for example by passing through a die, using, for example, a piston or a continuous twin-screw or single-screw extruder. The diameter of the die of the extruder is advantageously variable and is between 0.5 and 5 mm, preferably between 0.5 and 3 mm, more preferably between 0.5 and 2 mm. The shape of the die, and therefore the shape of the material obtained in extruded form, is advantageously cylindrical, trilobal, quadrilobal or even multilobal.

The mixing-extrusion shaping step f) is advantageously carried out in a manner known to persons skilled in the art.

The mixing-extrusion shaping step f) and, in particular, the mixing step may optionally be carried out in the presence of a binder or in the absence of binder.

Preferably, the dried paste obtained at the end of the drying step e), and optionally at least one binder, as well as the base in the case where it is present, are mixed, preferably simultaneously in a mixer. The mixer is advantageously chosen from batch mixers, preferably with a cam or Z-arm, or with the aid of a twin-screw mixer. The mixing conditions are adjusted in a manner known to persons skilled in the art in order to obtain a homogeneous and extrudable paste.

In extrusion mixing methods known to persons skilled in the art, the extrudability of the dough may advantageously be adjusted by the addition of water in order to obtain a paste that is suitable for carrying out the extrusion shaping step f).

Preferably, the dried paste is mixed in the presence of an amount of base between 0.5 and 2.5% by weight relative to the dry matter, wherein the dry matter is the weight of the paste resulting from the step e), dried in an oven at 200° C. for 6 h.

In the case where the amount of base added is greater than 3% by weight, the performance of the adsorption solids is strongly degraded.

Preferably, the inorganic bases are chosen from among sodium hydroxide, potassium hydroxide and ammonia, while the organic bases in solution are chosen from among amines and quaternary ammonium compounds. Preferably, the organic bases in solution are chosen from among alkylethanol amines and ethoxylated alkylamines. The organic bases are preferably used in solution in water.

Very preferably, the base is ammonia and preferably ammonia in aqueous solution (NH$_4$OH).

Preferably, no acid is added in the extrusion mixing shaping step f).

In the case where the step f) of mixing-extrusion shaping and, in particular, the mixing step is carried out in the presence of a binder, wherein the binder is advantageously chosen from among organic or inorganic binders.

The organic binder(s) which may be used in the shaping step f) is/are advantageously chosen from among paraffins and polymers, taken alone or as a mixture.

Preferably, the organic binder(s) is/are chosen from among polyvinylpyrrolidone (PVP), polyvinyl alcohol (PVA), an aqueous dispersion of a mixture of paraffin waxes and of polyethylene such as, for example, Cerfobol R75, polysaccharides, methylcellulose, hydroxy-propylmethylcellulose, hydroxyethylcellulose and carboxymethyl-cellulose, taken alone or as a mixture, preferably from among poly vinylpyrrolidone (PVP), polyvinyl alcohol (PVA) and Cerfobol R75, and, in a preferred manner, among polyvinylpyrrolidone (PVP) and polyvinyl alcohol (PVA).

A very preferred organic binder is polyvinylpyrrolidone (PVP).

Cerfobol R75 comprises 28.4% dry paraffinic organic mass diluted in an aqueous phase.

The proportion of the organic binder(s) added in the shaping step (f) is advantageously between 0.5 and 20% by weight, preferably between 0.5 and 15% by weight, more preferably between 1 and 13% by weight, relative to the total weight of dry paste to be shaped.

The addition of at least one organic binder in the step facilitates the extrusion shaping of step f) of the method according to the invention.

The addition of at least one organic binder in step f) also makes it possible to obtain a crystallized solid material in the form of extrudates having an improved stirring resistance in contact with the brine or water.

Preferably, the inorganic binder(s) used in the shaping step f) is/are advantageously chosen from among silicic binders, clay-type binders and inorganic binders which may be generated in the conditions of step e) by adding precursors of inorganic binders.

Preferably, the inorganic binder(s) used in the shaping step (f) is/are advantageously chosen from silicic binders.

Preferably, the silicic binders are advantageously chosen from among precipitated silica and silica derived from by-products such as fly ash, such as, for example, silico-aluminous or silico-calcic particles, silicic acid, sodium metasilicate and silica fumes. Colloidal silica, for example in the form of a stabilized suspension, such as, for example, commercial products such as Ludox® or Klebosol® may also be used.

Preferably, the silicic binder is in amorphous or crystalline form. Very preferably, the silica is used in powder form or in colloidal form.

The proportion of the inorganic binder(s) added in the shaping step (f) is/are advantageously between 0.5 and 20 by weight, preferably between 0.5 and 15% by weight, more preferably between 1 and 13% by weight, relative to the total weight of dry paste to be shaped.

The addition of at least one inorganic binder in step f) facilitates its extrusion shaping.

The addition of at least one inorganic binder in step f) also makes it possible to obtain a shaped crystallized solid material, preferably in the form of extrudates, having an improved stirring resistance in contact with the brine.

Preferably, the extrusion-shaped material obtained at the end of step f) undergoes an optional drying step at a temperature of between 20 and 200° C. for a period preferably of between 1 hour and 20 hours, to obtain the crystalline solid material of formula $LiX_x \cdot 2Al(OH)_3, nH_2O$ in the shape of extrudates.

Preferably, the drying step is carried out at a temperature of between 20 and 100° C., more preferably between 20 and 80° C., and very preferably between 20 and 60° C., preferably for a duration of between 1 and 18 hours, more preferably between 5 and 14 hours and very preferably between 8 and 14 hours.

The specific conditions of the drying step make it possible to obtain a crystallized solid material having the desired $LiX_x \cdot 2Al(OH)_3, nH_2O$ phase.

The drying step is advantageously carried out according to the techniques known to persons skilled in the art and preferably in an oven.

According to the invention, the extruded and possibly dried shaped material obtained at the end of step f) is subjected to a hydrothermal treatment step g) at a temperature of between 50 and 200° C., and for a period of preferably between 30 min and 12 hours.

Preferably, step g) is carried out at a temperature between 70 and 200° C., more preferably between 70 and 180° C., and very preferably between 80 and 150° C., for example for a period between 30 minutes and 120 hours.

The hydrothermal treatment step g) is advantageously carried out according to a technique known to persons skilled in the art.

According to a preferred embodiment, step g) is carried out in an autoclave, under autogenous pressure and under a saturated water atmosphere. Preferably, step h) is carried out by introducing a liquid at the bottom of the autoclave, wherein the liquid is chosen from water, alone or as a mixture with at least one acid, a base or a lithium salt. Preferably, the shaped and dried material, and preferably the extrudates obtained at the end of step f) are not in contact with the liquid at the bottom of the autoclave.

In the case where water is introduced into the autoclave in admixture with an acid, the acid is advantageously chosen from among nitric acid, hydrochloric acid, sulfuric acid and carboxylic acid.

In the case where water is introduced into the autoclave in admixture with a base, the base is preferably selected from among lithium hydroxide, sodium hydroxide, potassium hydroxide and ammonia.

In the case where water is introduced into the autoclave mixed with a lithium salt, the lithium salt is advantageously chosen from among lithium chloride and lithium carbonate.

Preferably, step g) is carried out in the presence of a humid atmosphere comprising a water content of between 5 and 50% by weight, more preferably between 5 and 45% by weight, and very preferably between 5 and 40% by weight.

According to one embodiment, step g) may be carried out in a climatic drying oven, in the presence of a moist air stream containing between 5 and 50% by weight, preferably between 5 and 45% by weight, and more preferably between 4 and 40% by weight of water, or in an oven operating under a moist air flow containing between 5 and 50% by weight of water, preferably between 5 and 45% by weight, and more preferably between 5 and 40% by weight of water according to methods known to persons skilled in the art.

The hydrothermal treatment step g) takes place in a controlled atmosphere that makes it possible to obtain a crystalline solid material of formula $LiX_x \cdot 2Al(OH)_3, nH_2O$, wherein n is between 0.01 and 10, x is equal to 1 when X is an anion chosen from among chloride, hydroxide and nitrate anions, and x is equal to 0.5 when X is an anion chosen from among sulphate and carbonate anions, preferably shaped in the form of extrudates and exhibiting good behavior and good mechanical strength when placed in contact with a brine or a diluted solution and preferably in water.

At the end of the step g), the shaped material preferably in the form of extrudates, is then advantageously recovered and may optionally be washed.

The extrusion-formed material obtained at the end of step g) may then be optionally subjected to a drying step h), wherein the drying step preferably operates at a temperature of between 15 and 50° C. for a period preferably between 1 h and 12 hours in order to obtain the crystallized solid material of formula $LiX_x.2Al(OH)_3.nH_2O$, wherein n is between 0.01 and 10, x is equal to 1 when X is an anion chosen from among chloride, hydroxide and nitrate anions, and x is 0.5 when X is an anion selected from among sulfate and carbonate anions.

The drying step h) is advantageously carried out according to the techniques known to persons skilled in the art, and preferably in an oven.

The method according to the present invention thus makes it possible to obtain a crystallized solid material of formula $LiX_x.2Al(OH)_3.nH_2O$, wherein n is between 0.01 and 10, preferably between 0.1 and 5, and more preferably between 0.1 and 1, wherein x is equal to 1 when X is an anion chosen from among chloride, hydroxide and nitrate anions, and x is equal to 0.5 when X is an anion chosen from among sulphate and carbonate anions, preferably in the form of extrudates with a cross-section or diameter of between 0.2 and 5 mm, more preferably between 0.3 and 4 mm, even more preferably between 0.3 and 3 mm, very preferably between 0.3 and 2 mm and most preferably between 0.3 and 1.8 mm.

The best results in terms of mechanical strength and cohesion of the crystallized solid material obtained according to the preparation method according to the invention are obtained in the case of extrudates with a section or diameter between 0.2 and 5 mm and preferably between 0.3 and 1.8 mm, wherein the extrudates are obtained by the combination of a specific shaping step as described above and a final drying step i) carried out at a temperature between 20 and 200° C., preferably between 20 and 60° C., for a period preferably between 1 and 20 hours, more preferably between 5 and 14 hours, very preferably between 8 and 14 hours, and particularly for 8 hours.

The crystallized solid material of formula $LiX_x.2Al(OH)_3.nH_2O$ shaped, by extrusion and prepared according to the sequence of steps a) to h) of the preparation method according to the invention may be characterized according to the following techniques: nitrogen adsorption for the determination of the specific surface area according to the BET method; X-ray diffractometry in the diffraction angle range $2\Theta=0.8$ to $40°\pm0.02°$ in reflection geometry to identify the structure of the material and the elemental analysis.

The shaped crystalline solid material of formula $LiX_x.2Al(OH)_3.nH_2O$ and preferably in the form of extrudates, advantageously has a specific surface area measured according to the BET method of between 1 and 30 $m^2/g$, and preferably between 1 and 20 $m^2/g$.

The X-ray diffraction pattern of the material in the form of extrudates corresponds to a crystallized solid of formula $LiX_x.2Al(OH)_3.nH_2O$ according to JCPDS sheet No. 0031-07-00, wherein n is between 0.01 and 10, preferably between 0.1 and 0.5, more preferably between 0.1 and 5, and very preferably between 0.1 and 1, obtained according to the invention, and advantageously in the form of extrudates.

The preparation method according to the present invention thus makes it possible to obtain a crystallized solid material of formula $LiX_x.2Al(OH)_3.nH_2O$, wherein n, x and X have the above definition, preferably in the form of extrudates, and wherein both have a low BET surface area, good cohesion, and no apparent defect, while offering good cohesion and good mechanical strength when it is placed in contact with a brine or a diluted solution, and preferably in water.

The good properties of the material obtained result from the combined effect of shaping, preferably by extrusion of a paste, in the absence of a binder, directly after a drying step under specific conditions, and the implementation of a drying step according to the invention, also operating under specific conditions and also the implementation of a final hydrothermal treatment step operating preferably in an autoclave.

Furthermore, the crystallized solid material obtained by extrusion thus obtained of formula $LiX_x.2Al(OH)_3.nH_2O$, wherein n, x and X have the above definition, offer a lithium adsorption capacity and improved adsorption kinetics compared to prior art materials when used in a method for extraction of lithium from a saline solution.

The materials obtained according to the invention have an improved adsorption capacity compared to the materials of the prior art greater than 4.5 mg Li/g dry solid material, i.e. solid material dried to 200° C., preferably between 4.5 and 10 mg Li/g, preferably between 4.5 and 8, and very preferably between 4.5 and 7 mg Li/g dry solid material.

An object of the present invention is also a method for extracting lithium from a saline solution using the crystallized solid material of formula $LiX_x.2Al(OH)_3.nH_2O$, wherein n is between 0.01 and 10, x is equal to 1 when X is an anion chosen from among chloride, hydroxide and nitrate anions, and x is equal to 0.5 when X is an anion chosen from among sulfate and carbonate anions, prepared according to the invention.

The saline solution used in the extraction method according to the invention advantageously comprises a lithium concentration of between 0.001 mol/L and 0.5 mol/L, preferably between 0.02 mol/L and 0.3 mol/L.

The saline solution also contains other species, such as, for example, the species chosen from the following list: Na, K, Rb, Cs, Mg, Ca, Sr, Ba, F, Cl, Br, I, $SO_4$, $CO_3$, $NO_3$, and $HCO_3$. The saline solution may advantageously be saturated with salts or not.

The saline solution may be any natural saline solution, concentrated or resulting from a lithium extraction or transformation method. For example, the saline solution used in the extraction method according to the invention may advantageously be chosen from brine from salt lakes or from geothermal sources, brines subjected to evaporation to obtain brines concentrated in lithium, seawater, effluents from cathode production plants, or lithium chloride or hydroxide production and effluents from minerals using the lithium extraction method.

The lithium extraction method according to the invention is preferably a selective lithium extraction method. In fact, it allows the separation of lithium from alkali metals, preferably sodium (Na), and potassium (K) and alkaline earth metals, preferably magnesium (Mg), calcium (Ca) and strontium (Sr), present in a massive amount in the saline solutions treated in the extraction method.

The lithium extraction method according to the invention also allows the selective separation of lithium from other compounds such as boron and sulphates.

The lithium extraction method according to the invention is advantageously carried out in a unit comprising at least one column, wherein the column(s) comprise(s) at least one bed of the crystallized solid material of formula $LiX_x.2Al$ (OH)$_3$,nH$_2$O, wherein n, x and X have the above definition, and it is shaped and prepared according to the preparation method according to the invention.

Preferably, the lithium extraction method according to the invention is implemented in a unit comprising at least two columns, and preferably between two and three columns, comprising at least one bed of crystallized solid material of formula LiX$_x$.2Al(OH)$_3$,nH$_2$O, wherein n, x and X are as defined above.

The lithium extraction method advantageously comprises at least the following steps:
- an activation step of the crystallized solid material of formula LiX$_x$.2Al(OH)$_3$,nH$_2$O, wherein n, x and X have the above definition,
- a step of charging the adsorption-activated material that is carried out by passing the saline solution on the activated material,
- optionally, at least one step of washing the saline solution, and impregnating the material by passing a washing solution on the material,
- a lithium desorption step carried out by passing water or an aqueous solution of lithium salt on the material in order to obtain an eluate comprising, at least, lithium.

Preferably, the lithium extraction method according to the invention comprises a prior step of setting the material in a column.

Preferably, the extraction method comprises an optional step of washing the saline solution, and impregnating the material by passing a washing solution on the material, wherein the washing step is preferably carried out between the charging step and the desorption step.

Preferably, the step of activating the crystallized solid material of formula LiX$_x$.2Al(OH)$_3$,nH$_2$O, wherein n, x and X have the above definition, preferably shaped and in the form of extrudates, is performed only once during the columnization of the synthesized material and shaped according to the preparation method according to the invention.

The activation step makes it possible to activate the sites intended to selectively adsorb lithium.

Preferably, the activation step is advantageously carried out by the passage of an activation solution chosen from water and a lithium salt solution having a concentration of between 0.001 mol/L and 0.1 mol/L, preferably between 0.001 mol/L and 0.05 mol/L and more preferably between 0.01 and 0.04 mol/L.

Preferably, the lithium salt used in solution in the activation step is chosen from among lithium chloride (LiCl), lithium nitrate and lithium bromide.

Very preferably, the lithium salt used in solution in the activation step is lithium chloride (LiCl).

The activation step is advantageously carried out at a temperature of between 0° C. and 90° C., more preferably between 10° C. and 60° C., and very preferably between 10° C. and 30° C. with a residence time for activating solution in the column, preferably between 0.03 and 10 h, more preferably between 0.06 and 1 h.

Advantageously, the amount of solution required for activation is between 1 and 30 column volumes, preferably between 2 and 20 column volumes.

The column volume is also called the volume occupied by the bed of the solid in the column or BV according to the terminology specific to the technical field known to persons skilled in the art.

The crystallized solid material may optionally undergo the activation step before a washing step with a washing solution and preferably a solution of lithium chloride (LiCl) or a mixture of lithium chloride (LiCl) and sodium chloride (NaCl).

The step of charging the activated material by adsorption is advantageously carried out by passing the treated saline solution in the extraction method according to the invention, on the activated material.

The charging step is advantageously carried out at a temperature between 0° C. and 90° C., more preferably between 10° C. and 70° C., with a residence time of the solution, preferably of the treated salt solution, in the column preferably between 0.03 and 10 h, more preferably between 0.06 and 1 h.

The amount of solution necessary to saturate the material depends on the adsorption capacity of the material and the lithium concentration of the saline solution.

The adsorption capacity of the materials according to the invention is greater than 4.5 mg Li/g of dry solid material, preferably between 4.5 and 10 mg Li/g, more preferably between 4.5 and 8, most preferably between 4.5 and 7 mg Li/g dry solid material.

In the case where the lithium extraction method according to the invention is implemented in a unit comprising two columns, the first column is advantageously saturated with lithium during the charging step. The second column, receiving the outlet stream of the first column, is advantageously charged until a lithium leak not exceeding 10% of the lithium concentration of the inlet stream and preferably 5%, thus making it possible to maximize the recovery efficiency of lithium.

In the case where the lithium extraction method according to the invention is carried out in a unit comprising three columns, the third column, already saturated with lithium, is devoted to the steps of washing and then of desorption of lithium as described below, while loading the other two columns.

The first fraction of the outlet stream of the adsorption charging step that is advantageously between 0 and 1 column volumes, corresponds to the removal of the impregnant resulting from the activation step of the solid material. This fraction may be considered as an effluent or as recycled, and preferably recycled as an inlet stream of the desorption step. In the case of the treatment of a natural brine or seawater beyond 1 column volume, the entire outlet stream of the adsorption charging step, hereinafter referred to as raffinate, which does not undergo any chemical treatment, is advantageously and preferably returned to the original salt solution deposit.

At the end of the charging step by passing the saline solution treated in the method according to the invention on the activated material, the saline solution impregnates the activated material.

The saline solution impregnating the activated material is optionally washed in at least one washing step by passing a washing solution on the material. The step(s) of washing the saline solution impregnating the material, is/are advantageously carried out by upward or downward passage of a washing solution on the material, and preferably downward.

Preferably, the washing solution is selected from water and an aqueous solution of sodium salt and preferably sodium chloride (NaCl), optionally comprising a lithium salt and preferably lithium chloride (LiCl), wherein the solution advantageously has a concentration of sodium salt, preferably sodium chloride (NaCl), greater than 0.5 mol/L, preferably between 1 mol/L and saturation, and a concentration of lithium salt and preferably in lithium chloride (LiCl), between 0 mol/L and 2 mol/L.

According to a preferred embodiment, the saline solution impregnating the activated material undergoes a final washing step by passing an aqueous washing solution of sodium chloride (NaCl) optionally comprising lithium chloride (LiCl), on the material.

The washing step is advantageously carried out at a temperature between 0° C. and 90° C., preferably between 10° C. and 70° C., and with a residence time of the solution, preferably of the washing solution in the column of between 0.03 and 10 h, preferably between 0.06 and 1 h. The amount of solution required for washing is between 0.1 and 10 column volumes, and preferably in the range 0.5 to 5 column volumes.

The outlet stream of the washing step is considered as an effluent, or is advantageously recycled, and preferably recycled at the inlet of the charging step or directly at the inlet of the second column in the case where the method of extraction of lithium according to the invention is implemented in a unit comprising at least two columns.

The washing step allows the washing of the saline solution impregnated in the material during the step of charging the material by adsorption, while limiting the desorption of lithium.

In the case where the washing solution is a concentrated aqueous solution of sodium chloride (NaCl), the washing step not only makes it possible to eliminate the saline solution impregnated in the material during the step of charging the material by adsorption but also elements such as boron, sulphates, alkalis other than lithium and sodium and alkaline earths.

The lithium desorption step is then carried out by passing water or an aqueous solution of lithium chloride (LiCl) on the material at the end of the washing step in order to obtain an eluate comprising at least lithium.

Preferably, the desorption step is carried out by ascending or descending, and preferably descending, passage of a desorption solution chosen from water and a solution of lithium chloride (LiCl) containing from 0.001 mol/L to 2 mol/L LiCl, and preferably 0.01 mol/L to 1 mol/L.

The desorption step is advantageously carried out at a temperature of between 0° C. and 90° C., preferably between 10° C. and 70° C., with a residence time of the desorption solution in the column, preferably between 0.03 and 10 h, and preferably between 0.06 and 1 h.

The amount of lithium chloride solution (LiCl) required for the desorption is advantageously between 0.01 and 10 column volumes, and preferably between 0.05 and 5 column volumes.

The output stream of the lithium desorption step generates the final product of the method, called the eluate.

The eluate is advantageously recovered between 0 and 4 column volumes, and preferably between 0.2 and 3 column volumes.

All the other fractions of the output stream of this step not constituting the final product called the eluate, is considered as an effluent or is advantageously recycled, and preferably recycled at the inlet of the charging, washing or elution.

The eluate obtained at the end of the extraction method according to the invention is a solution containing mainly Li, Na and Cl elements as well as impurities preferably chosen from among K, Mg, Ca, Sr, B or $SO_4$.

The eluate is then advantageously concentrated and purified to obtain a lithium salt of high purity.

The lithium extraction method according to the invention allows the selective extraction of lithium from a saline solution and thus makes it possible to obtain a high purification factor compared to the initial saline solution, calculated as the ratio X/Li which is equal to the molar ratio of concentration X/Li in the initial saline solution divided by the molar ratio of concentration X/Li in the eluate, wherein X is chosen from sodium (Na), potassium (K), magnesium (Mg), calcium (Ca), boron (B), sulfur (S) and strontium (Sr).

The present invention also covers a lithium extraction device characterized in that it comprises a unit comprising at least one column, wherein the column comprises at least one lining comprising the crystallized solid material of formula $LiX_x \cdot 2Al(OH)_3 \cdot nH_2O$, wherein n is between 0.01 and 10, x is 1 when X is an anion selected from among chloride, hydroxide and nitrate anions, and x is 0.5 when X is an anion selected from among sulfate and carbonate anions, as defined according to the present invention, or as prepared according to the method according to the invention.

More particularly, the invention covers a device implementing the lithium extraction method according to the invention. Even more specifically, the device of the present invention comprises units or means implementing the various steps of the lithium extraction method according to the invention.

"According to the invention" or an equivalent term is understood to mean any embodiment, variant, advantageous or preferred characteristic, taken alone or in any combination thereof, without any limitation.

Figure 1:
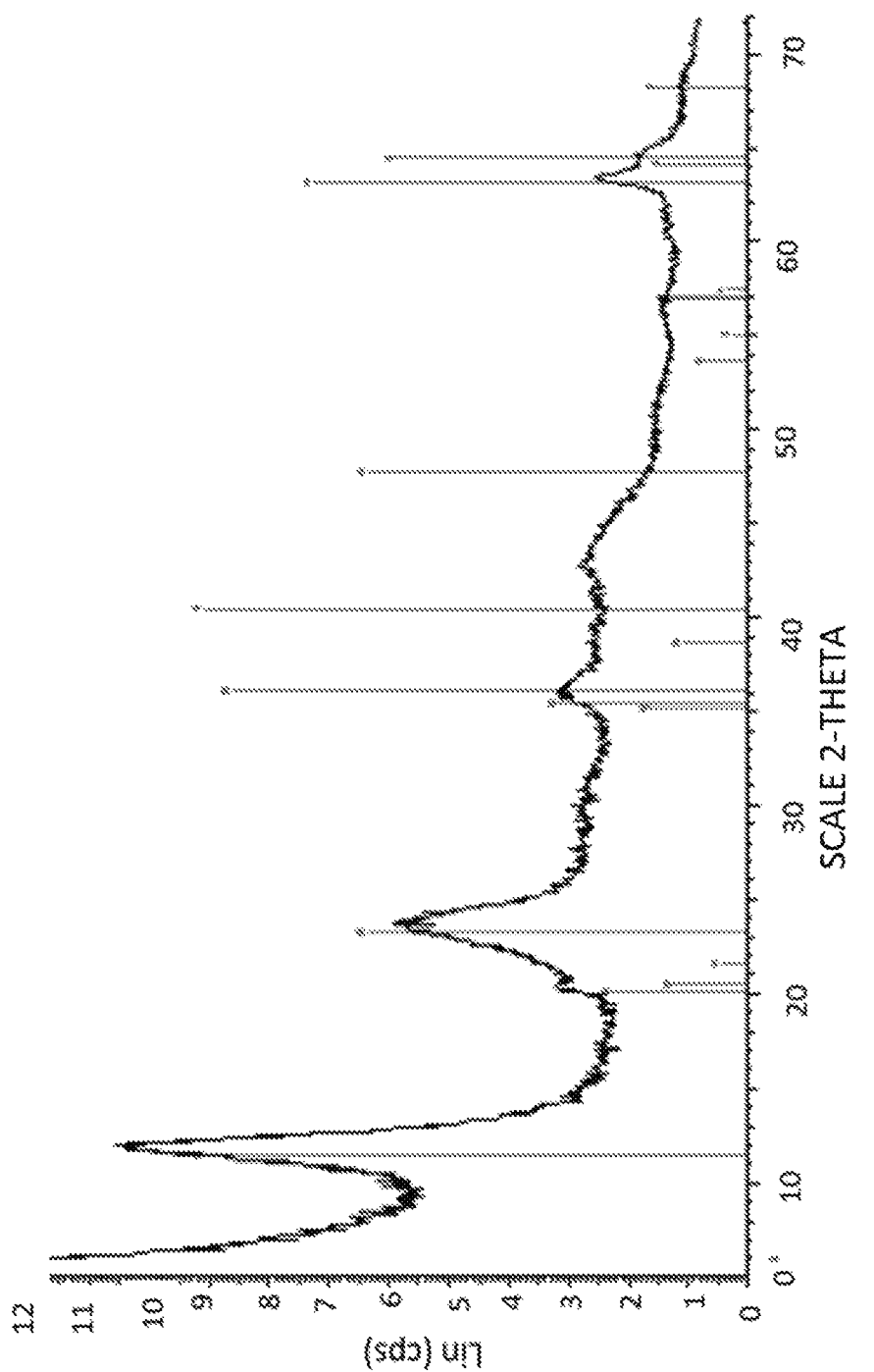
FIG. 1 shows the X-ray diffraction pattern of the solid material of formula $LiX_x \cdot 2Al(OH)_3 \cdot nH_2O$, wherein X=Cl, x=1 and n is between 0.01 and 10, and that is obtained in the form of extrudates in Example 2 according to the invention.

The invention is illustrated by the following examples which in no way present a limiting character.

EXAMPLES

Example 1: (Non-Compliant)

A solid material of formula $LiCl \cdot 2Al(OH)_3 \cdot nH_2O$ is prepared, wherein n is between 0.01 and 1, according to a synthesis method not in accordance with the invention, wherein the synthesis step $Al(OH)_3$ is carried out at pH=10.5

1/ Synthesis $Al(OH)_3$

In a beaker cooled by an ice bath to ensure a temperature of 25° C., a solution containing 326 ml of deionized water and 135.6 g of aluminum chloride hexahydrate ($AlCl_3$) is prepared. Then with magnetic stirring, sodium hydroxide (NaOH) is added slowly until pH 10.5 is reached. This cake is suspended in a 3 L beaker with 320 mL of water.

The XRD of the precipitate shows that the precipitate obtained in Example 1 is indeed a boehmite precipitate. The boehmite precipitate obtained in Example 1 is crystallized.

2/ Addition of Lithium Chloride LiCl.

A solution containing 78.5 g of lithium chloride LiCl supplied by Prolabo and 1326 ml of water which is added to the cake is prepared. This reaction medium is stirred and heated to 80° C. for 2 h.

Filtration and drying in an oven at 80° C. for 8 h follow the first 2 steps.

3/ Mixing Extrusion

The shaping step is performed by mixing and extrusion. For the mixing step, 35.5 g of paste obtained above is introduced into a Brabender-type mixer (80 ml tank volume) with 1.39 g of ammonia solution at 20.18% by weight, which corresponds to 1% by weight of base ($NH_4OH$) relative to the dry matter, wherein the dry matter is the weight of the paste resulting from the preceding drying step, dried in an oven at 200° C. for 6 hours. The ammoniacal solution is mixed with 16 g of demineralized water and is added in 2 minutes by mixing at 50 rpm. A supplement of water of about 2.7 g is added in order to obtain a cohesive, homogeneous and extrudable paste. The mixing is continued at the same speed for 30 minutes after the end of the addition of ammonia and water.

The paste so obtained is shaped using a piston extruder (MTS) equipped with a cylindrical die 1 mm in diameter.

The extrudates obtained are then subjected to a hydrothermal treatment step in an autoclave comprising water. 10 g of extrudates are placed in a basket placed in a 500 ml autoclave. 20 g of distilled water are put in the bottom of the autoclave. The extrudates are not in contact with the liquid at the bottom of the autoclave.

The hydrothermal treatment is carried out at a temperature of 100° C. for 6 h under an atmosphere saturated with water.

Extrudates of the solid material of formula $LiCl.2Al(OH)_3,nH_2O$, wherein n=0.25, with good cohesion and good appearance are obtained. An $LiCl.2Al(OH)_3,nH_2O$ phase is detected on the X-ray diffraction pattern of the extrudates of the solid material of formula $LiCl.2Al(OH)_3,nH_2O$, wherein n=0.25 as obtained in Example 1 (FIG. 1).

The extrudates obtained are also characterized by the following measurements:

Elemental analysis shows a good Li/Al/Cl stoichiometry corresponding to the composition of an $LiCl.2Al(OH)_3,nH_2O$ structure Al=21.2% mass; Li=4.2% mass; Cl,=19% mass.

The extrudates obtained have a specific surface area: $S_{BET}$=4 m$^2$/g.

The extrudates obtained according to Example 1 have good visual cohesion, have no or few cracks and have both a very good cohesion and a very good mechanical strength when they are in contact with a brine (percentage destruction of less than 17% in the cohesion test) or water (percentage of destruction less than 24% in the cohesion test).

Example 2 (According to the Invention)

A solid material of formula $LiCl.2Al(OH)_3,nH_2O$ is prepared, wherein n is between 0.01 and 1, according to a synthesis method according to the invention, in which the shaping step is implemented by direct extrusion, without a binder.

1/ Boehmite Precipitation AlOOH

In a beaker cooled by an ice bath, a solution containing 326 ml of deionized water and 135.6 g of aluminum chloride hexahydrate ($AlCl_3$) is prepared. Then, with magnetic stirring, 67.5 g of sodium hydroxide (NaOH) are added for 30 minutes to adjust the pH. The pH reached at the end of the synthesis is 8. The temperature is maintained at 20° C. throughout the duration of the precipitation step. The suspension obtained is filtered and then washed with water. The cake is suspended in a 3 L beaker with 320 mL of water.

A sample of the precipitate obtained is taken from the reaction medium. The XRD of the precipitate shows that the precipitate obtained in Example 2 is indeed a boehmite precipitate. The boehmite precipitate obtained in Example 2 is poorly crystallized.

2/ Addition of Lithium Chloride LiCl

A solution containing 78.5 g of lithium chloride LiCl supplied by Prolabo and 1326 ml of water which is added to the cake is prepared. This reaction medium is stirred and heated to 80° C. for 2 h.

Filtration and drying in an oven at 80° C. for 8 hours follow the first 2 steps.

3/ Mixing Extrusion

The shaping step is performed by mixing and extrusion. For the mixing step, 35.5 g of the paste obtained above is introduced into a Brabender-type mixer (80 ml tank volume) with 1.39 g of ammonia solution at 20.18% by weight, which corresponds to 1% by weight of base ($NH_4OH$) relative to the dry matter, wherein the dry matter is the mass of the paste resulting from the preceding drying step, dried in an oven at 200° C. for 6 hours. The ammoniacal solution is mixed with 16 g of demineralized water and is added in 2 minutes by mixing at 50 rpm. A supplement of water of about 2.7 g is added in order to obtain a cohesive, homogeneous and extrudable paste. The mixing is continued at the same speed for 30 minutes after the end of the addition of ammonia and water.

The paste so obtained is shaped using a piston extruder (MTS) equipped with a cylindrical die 1 mm in diameter.

The extrudates obtained are then subjected to a hydrothermal treatment step in an autoclave comprising water. 10 g of extrudates are placed in a basket placed in a 500 ml autoclave. 20 g of distilled water are put in the bottom of the autoclave. The extrudates are not in contact with the liquid at the bottom of the autoclave.

The hydrothermal treatment is carried out at a temperature of 100° C. for 6 h under an atmosphere saturated with water.

Extrudates of the solid material of formula $LiCl.2Al(OH)_3,nH_2O$, wherein n=0.25, with good cohesion and good appearance are obtained. An $LiCl.2Al(OH)_3,nH_2O$ phase is detected on the X-ray diffraction pattern of the extrudates of the solid material of formula $LiCl.2Al(OH)_3,nH_2O$, wherein n=0.25 as obtained in Example 2 (FIG. 1).

The extrudates obtained are also characterized by the following measurements:

Elemental analysis shows a good Li/Al/Cl stoichiometry corresponding to the composition of an $LiCl.2Al(OH)_3,nH_2O$ structure Al=21.2% mass; Li=4.2% mass; Cl,=19% mass.

The extrudates obtained have a specific surface area: $S_{BET}$=3 m$^2$/g.

The extrudates obtained according to Example 2 have good visual cohesion, have no, or only few, cracks and exhibit both very good cohesion and very good mechanical strength when they are in contact with a brine (percentage destruction of less than 15% in the cohesion test) or water (percentage of destruction less than 20% in the cohesion test).

Example 3 (Comparative: Direct Extrusion without Basic Mixing)

A solid material of formula $LiCl.2Al(OH)_3,nH_2O$ is prepared, wherein n is between 0.01 and 1, according to a synthesis method according to the invention, in which the shaping step is implemented by direct extrusion, without basic mixing.

1/ Boehmite Precipitation AlOOH

In a beaker cooled by an ice bath, a solution containing 326 ml of deionized water and 135.6 g of aluminum chloride hexahydrate ($AlCl_3$) is prepared. Then, with magnetic stirring, 67.5 g of sodium hydroxide (NaOH) are added for 30 minutes to adjust the pH. The pH reached at the end of the synthesis is 8. The temperature is maintained at 20° C. throughout the duration of the precipitation step. The suspension obtained is filtered and then washed with water. The cake is suspended in a 3 L beaker with 320 mL of water.

A sample of the precipitate obtained is taken from the reaction medium. The XRD of the precipitate shows that the precipitate obtained in Example 3 is indeed a boehmite precipitate. The boehmite precipitate obtained in Example 3 is not very crystalline.

2/ Addition of Lithium Chloride LiCl

A solution containing 78.5 g of lithium chloride LiCl supplied by Prolabo and 1326 ml of water which is added to the cake is prepared. This reaction medium is stirred and heated to 80° C. for 2 h.

Filtration and drying in an oven at 80° C. for 8 hours follow the first 2 steps.

The solid material thus prepared is characterized by the formula $LiCl.2Al(OH)_3.nH_2O$, wherein n=0.25 according to a synthetic method according to the invention. The shaping step of the paste obtained is carried out directly after the drying step, without a prior mixing step and in the absence of a binder.

The paste obtained is shaped using a piston extruder (MTS) equipped with a cylindrical die 1 mm in diameter.

The extrudates obtained at the end of the shaping step are then dried in an oven at 40° C. for 12 hours.

The extrudates so obtained are then subjected to a hydrothermal treatment step in an autoclave comprising water. 10 g of extrudates are placed in a basket placed in a 500 ml autoclave. 20 g of distilled water are put in the bottom of the autoclave. The extrudates are not in contact with the liquid at the bottom of the autoclave.

The hydrothermal treatment is carried out at a temperature of 100° C. for 6 h under an atmosphere saturated with water.

Extrudates of the solid material of formula $LiCl.2Al(OH)_3.nH_2O$, wherein n=0.25, with good cohesion and good appearance are obtained. An $LiCl.2Al(OH)_3.nH_2O$ phase is detected on the X-ray diffraction pattern of the extrudates of the solid material of formula $LiCl.2Al(OH)_3.nH_2O$, wherein n=0.25 (not supplied).

The extrudates obtained are also characterized by the following measurements:

Elemental analysis shows a good Li/Al/Cl stoichiometry corresponding to the composition of an $LiCl.2Al(OH)_3$, $nH_2O$ structure.

Al=20.00% mass; Li=4.03% mass; Cl=20.5% mass; C=5.87% mass.

The extrudates obtained have a specific surface area: $S_{BET}=3$ m$^2$/g.

The extrudates obtained according to Example 3 visually exhibit good cohesion, and show no or few cracks. However, when they are subjected to the strength test described above, they have a cohesion and a mechanical strength that are worse than the material obtained in Example 2 according to the invention when they are brought into contact with brine (percentage of destruction of about 35% in the cohesion test) or water (percentage of destruction of about 45% in the cohesion test).

Example 4 (Comparative Acidic and then Basic Mixing)

A solid material of formula $LiCl.2Al(OH)_3.nH_2O$ is prepared, wherein n is between 0.01 and 1, according to a synthesis method according to the invention, in which the shaping step is implemented by direct extrusion, without a binder.

1/ Boehmite Precipitation AlOOH

In a beaker cooled by an ice bath, a solution containing 326 ml of deionized water and 135.6 g of aluminum chloride hexahydrate ($AlCl_3$) is prepared. Then, with magnetic stirring, 67.5 g of sodium hydroxide (NaOH) are added for 30 minutes to adjust the pH. The pH reached at the end of the synthesis is 8. The temperature is maintained at 20° C. throughout the duration of the precipitation step. The suspension obtained is filtered and then washed with water. The cake is suspended in a 3 L beaker with 320 mL of water.

A sample of the precipitate obtained is taken from the reaction medium. The XRD of the precipitate shows that the precipitate obtained is indeed a precipitate of boehmite. The boehmite precipitate obtained is not very crystalline.

2/ Addition of Lithium Chloride LiCl

A solution containing 78.5 g of lithium chloride LiCl supplied by Prolabo and 1326 ml of water which is added to the cake is prepared. This reaction medium is stirred and heated to 80° C. for 2 h.

Filtration and drying in an oven at 80° C. for 8 hours follow the first 2 steps.

The shaping of the dried paste obtained is carried out with a total acid content, expressed relative to the dried paste of 1% by weight, and a degree of neutralization of 20%. The mixing is carried out on a Brabender mixer. The dried paste is introduced into the mixer. The acidified water is added with nitric acid in 4 minutes, with mixing at 50 rpm. The acid mixing is continued for 10 minutes. A neutralization step is carried out by adding an ammoniacal solution and mixing for 3 minutes. The mixing is continued at the same speed for 30 minutes after the end of the addition of ammonia.

No cohesive paste could be obtained.

The wet solid obtained is shaped using a piston extruder (MTS) equipped with a cylindrical die 1 mm in diameter. No intact extrudates could be obtained.

The rushes obtained are very friable and have no hold in brine.

Example 5 (Comparative Mixing with Water then Extrusion)

A solid material of formula $LiCl.2Al(OH)_3.nH_2O$ is prepared, wherein n is between 0.01 and 1, according to a synthesis method according to the invention, in which the shaping step is implemented by direct extrusion, without a binder.

1/ Boehmite Precipitation AlOOH

In a beaker cooled by an ice bath, a solution containing 326 ml of deionized water and 135.6 g of aluminum chloride hexahydrate ($AlCl_3$) is prepared. Then, with magnetic stirring, 67.5 g of sodium hydroxide (NaOH) are added for 30 minutes to adjust the pH. The pH reached at the end of the synthesis is 8. The temperature is maintained at 20° C. throughout the duration of the precipitation step. The suspension obtained is filtered and then washed with water. The cake is suspended in a 3 L beaker with 320 mL of water.

A sample of the precipitate obtained is taken from the reaction medium. The XRD (FIG. 1) of the precipitate shows that the precipitate obtained in example 5 is indeed a boehmite precipitate. The boehmite precipitate obtained in Example 5 is not very crystallized.

2/ Addition of Lithium Chloride LiCl

A solution containing 78.5 g of lithium chloride LiCl supplied by Prolabo and 1326 ml of water which is added to the cake is prepared. This reaction medium is stirred and heated to 80° C. for 2 h.

Filtration and drying in an oven at 80° C. for 8 hours follow the first 2 steps.

3/ Mixing Extrusion

The shaping step is performed by mixing and extrusion. For the mixing step, 35.5 g of dough obtained above is introduced into a Brabender-type mixer (tank volume 80 ml). No basic additions are made. An addition of approximately 19 g of demineralized water is carried out in 2 minutes under mixing at 50 rpm. The mixing is continued at the same speed for 30 minutes after the end of the addition of water.

The paste obtained is shaped using a piston extruder (MTS) equipped with a cylindrical die 1 mm in diameter.

The extrudates obtained are also characterized by the following measurements:

Elemental analysis shows a good Li/Al/Cl stoichiometry corresponding to the composition of an $LiCl.2Al(OH)_3, nH_2O$ structure Al=20.00% mass; Li=4.03% mass; Cl=20.5% mass; C=5.87% mass.

The extrudates obtained have a specific surface area: $S_{BET}=3$ m$^2$/g.

The extrudates obtained according to Example 5 visually exhibit good cohesion, have no, or only few, cracks but exhibit poorer cohesion and mechanical strength when they are brought into contact with a brine (percentage of destruction of about 35% in the cohesion test) or water (destruction percentage of about 45% in the cohesion test).

Example 6: (Comparative Mixing in the Presence of 4% Ammonia)

A solid material of formula $LiCl.2Al(OH)_3, nH_2O$ is prepared, wherein n is between 0.01 and 1, according to a synthesis method according to the invention, in which the shaping step is implemented by direct extrusion, without a binder.

1/ Boehmite Precipitation AlOOH

In a beaker cooled by an ice bath, a solution containing 326 ml of deionized water and 135.6 g of aluminum chloride hexahydrate (AlCl$_3$) is prepared. Then, with magnetic stirring, 67.5 g of sodium hydroxide (NaOH) are added for 30 minutes to adjust the pH. The pH reached at the end of the synthesis is 8. The temperature is maintained at 20° C. throughout the duration of the precipitation step. The suspension obtained is filtered and then washed with water. The cake is suspended in a 3 L beaker with 320 mL of water.

A sample of the precipitate obtained is taken from the reaction medium. The XRD of the precipitate shows that the precipitate obtained in Example 6 is indeed a boehmite precipitate. The boehmite precipitate obtained in Example 6 is not very crystalline.

2/ Addition of Lithium Chloride LiCl

A solution containing 78.5 g of lithium chloride LiCl supplied by Prolabo and 1326 ml of water which is added to the cake is prepared. This reaction medium is stirred and heated to 80° C. for 2 h.

Filtration and drying in an oven at 80° C. for 8 hours follow the first 2 steps.

3/ Mixing Extrusion

The shaping step is performed by mixing and extrusion. For the mixing step, 35.5 g of dough obtained above is introduced into a Brabender-type mixer (tank volume 80 ml) with 5.56 g of ammonia solution at 20.18% by weight, which corresponds to 4% by weight of base (NH$_3$) relative to the dry matter, wherein the dry matter is the weight of the dough resulting from the preceding drying, dried in an oven at 200° C. for 6 h. The ammoniacal solution is mixed with approximately 12 g of demineralised water and is added in 2 minutes under stirring at 50 rpm. A supplement of water of about 2.7 g is added in order to obtain a cohesive, homogeneous and extrudable paste. The mixing is continued at the same speed for 30 minutes after the end of the addition of ammonia and water.

The paste obtained is shaped using a piston extruder (MTS) equipped with a cylindrical die 1 mm in diameter.

The extrudates obtained are then subjected to a hydrothermal treatment step in an autoclave comprising water. 10 g of extrudates are placed in a basket placed in a 500 ml autoclave. 20 g of distilled water are put in the bottom of the autoclave. The extrudates are not in contact with the liquid at the bottom of the autoclave.

The hydrothermal treatment is carried out at a temperature of 100° C. for 6 h under an atmosphere saturated with water.

Extrudates of the solid material of formula $LiCl.2Al(OH)_3, nH_2O$, wherein n=0.25, with good cohesion and good appearance are obtained.

An $LiCl.2Al(OH)_3, nH_2O$ phase is detected on the X-ray diffraction pattern of the extruded solid material of formula $LiCl.2Al(OH)_3, nH_2O$. An additional line that probably corresponds to the (NH$_4$)Cl phase is also detected.

The extrudates obtained are also characterized by the following measurements:

Elemental analysis shows a good Li/Al/Cl stoichiometry corresponding to the composition of an $LiCl.2Al(OH)_3, nH_2O$ structure Al=21.2% mass; Li=4.2% mass; Cl,=19% mass.

The extrudates obtained have a specific surface area: $S_{BET}=3$ m$^2$/g.

The extrudates obtained according to Example 6 visually exhibit good cohesion, have no, or only few, cracks and exhibit both very good cohesion and very good mechanical strength when they are brought into contact with a brine (percentage destruction of less than 15% in the cohesion test) or water (percentage of destruction less than 20% in the cohesion test).

Figure 2:
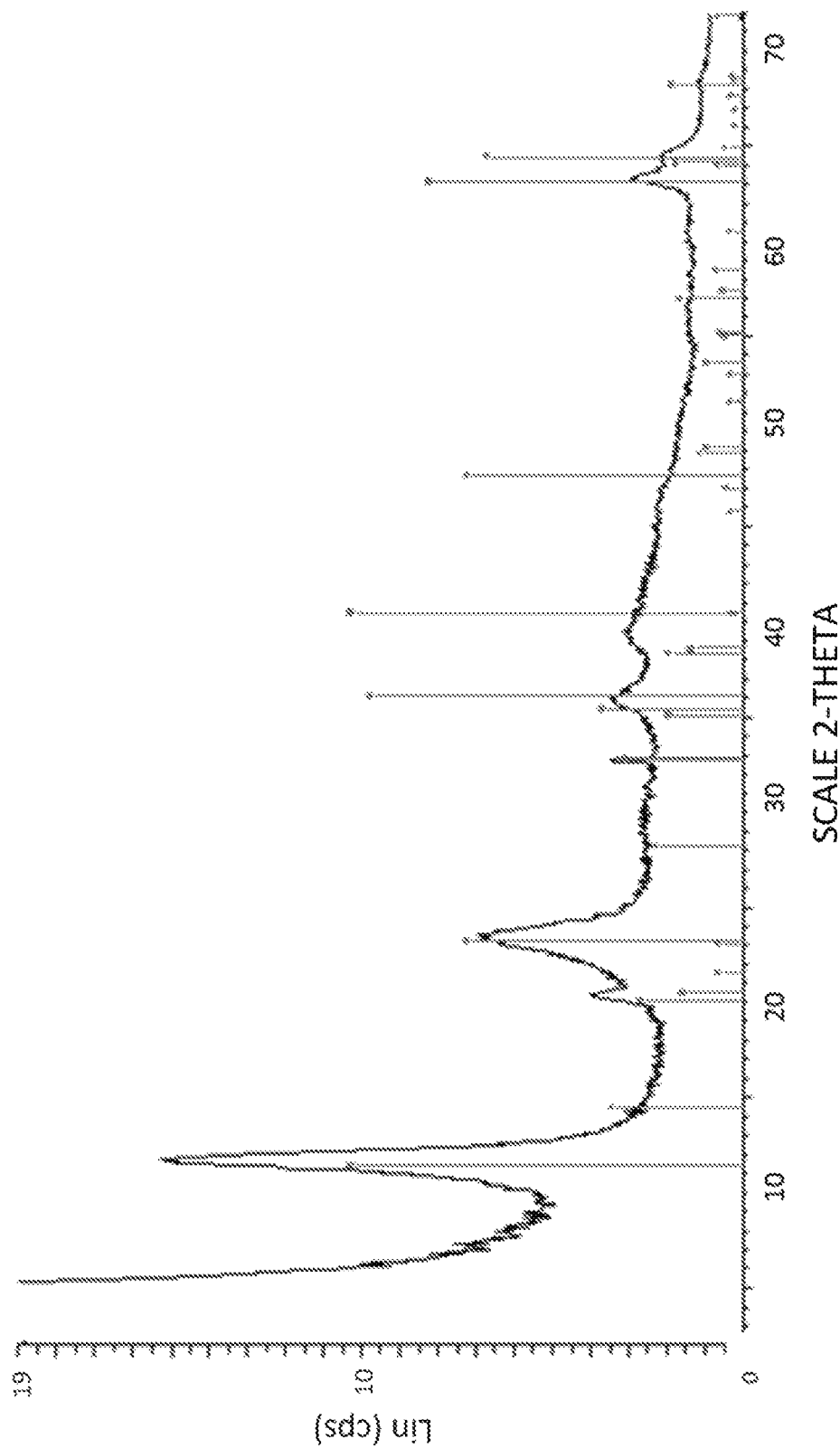
FIG. 2 shows the X-ray diffraction pattern of the solid material of formula $LiX_x \cdot 2Al(OH)_3 \cdot nH_2O$, wherein X=Cl, x=1 and n is between 0.01 and 10, and that is obtained in the form of extrudates in Example 6 and does not conform to the invention.

The addition of 4 wt % of base leads to a solid whose XRD spectrum (FIG. 2) is different from that obtained for the example according to the invention. Furthermore, the solid when it is introduced into the method described below has adsorption performance that is lower than that obtained for the example according to the invention.

Example 7 Adsorption Capacity and Adsorption Kinetics Test

The kinetics of lithium adsorption by the extrudates and their adsorption capacity is tested by performing a drilling curve also called leakage curve or column saturation curve. A saturation curve is produced for each of the extrudates obtained in Examples 1 to 6:

15 g of moist solid are placed in a column 10 column volumes of 0.02 mol/L lithium chloride (LiCl) saline solution crosses the closed circuit column until a stable lithium solution concentration is reached A natural solution containing approximately 0.06 mol/L of lithium crosses the column at a rate of 6 BV/h, i.e. six times the volume occupied by the bed of the extrudates in one hour.

The lithium concentration is measured at the outlet of the column as a function of the volume of solution passed.

The quantity of lithium adsorbed is calculated by integration on the volume of the difference between the concentration of the supply solution and the concentration measured at the outlet of the column. The capacity is then calculated by dividing this amount of lithium adsorbed by the dry mass of solid introduced into the column.

Figure 3:
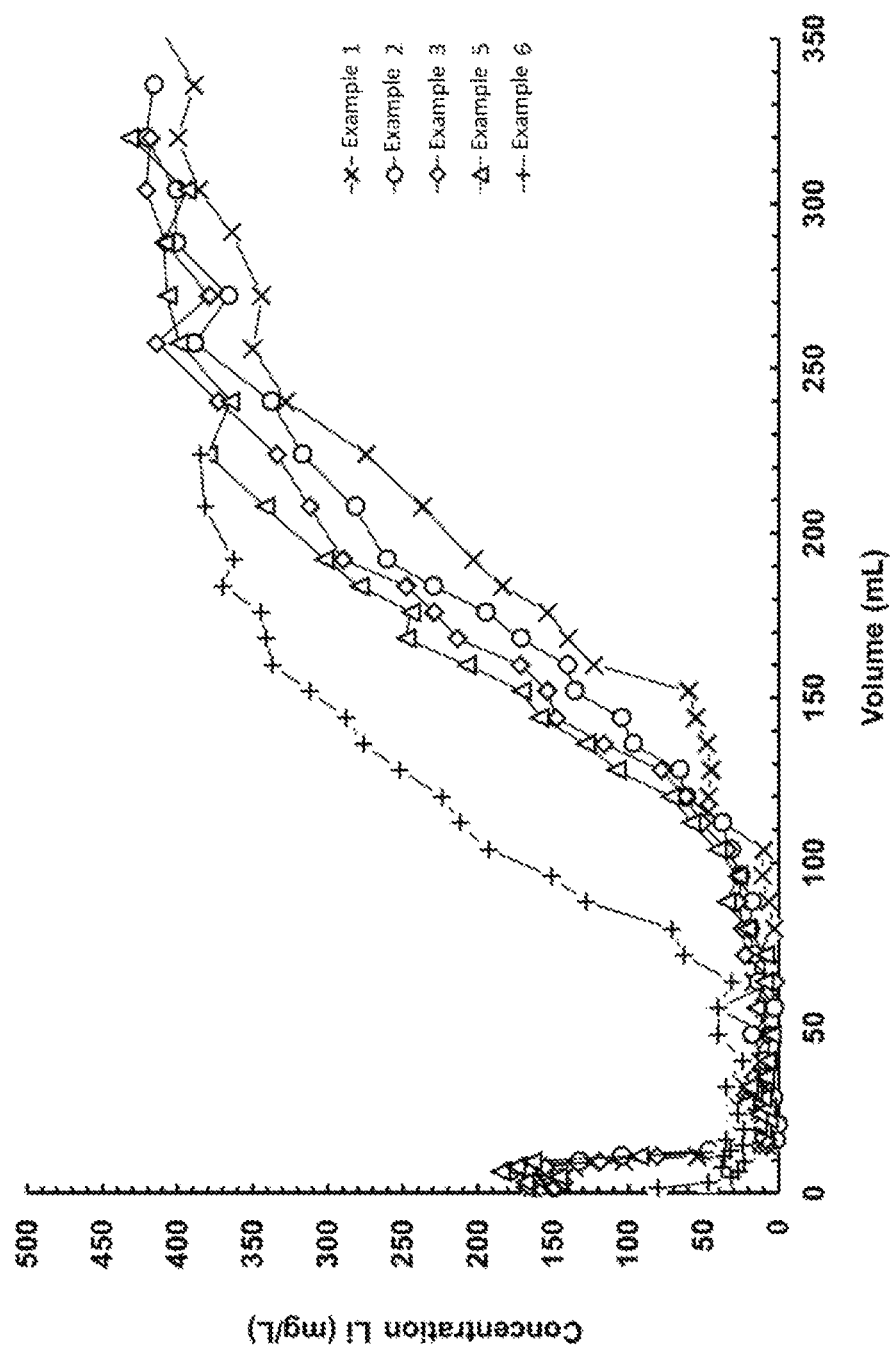
FIG. 3 shows the saturation curves obtained for each of the extrudates obtained in Examples 1, 2, 3, 5 and 6.

FIG. 3 illustrates the saturation curves obtained for each of the extrudates obtained in Examples 1, 2, 3, 5 and 6.

The extrudates obtained according to Example 2 according to the invention are compared with those obtained in Example 1, 3, 5 and 6 that are obtained according to preparation methods not in accordance with the invention. No test could be performed for Example 4 in view of the solids obtained. The extrudates of Example 2 obtained according to the invention show in addition to improved mechanical strength, a significant lithium adsorption capacity. Their lithium adsorption capacity is 6.4 mg (Li)/g (dry solid), is compared to 4.8 mg (Li)/g (dry solid) for the solids obtained according to Example 6, according to a method of preparation not in accordance with the invention. The extrudates obtained according to Examples 3 and 5, according to methods not in accordance with the invention, show a capacity equivalent to the extrudates obtained according to Example 2 according to the invention. The non-compliant extrudates obtained according to Example 1 show a degraded capacity of 5.3 mg (Li)/g (dry solid).

The invention claimed is:

1. Method for preparing a crystallized solid material of formula $Li_x.2Al(OH)_3,nH_2O$, wherein n is between 0.01 and 10, and x is equal to 1 when X is an anion selected from the group consisting of chloride, hydroxide and nitrate anions, and x is 0.5 when X is an anion selected from the group consisting of sulfate and carbonate anions, wherein the method comprises:
   a) precipitating boehmite, in an aqueous medium, of at least one basic precursor selected from the group consisting of among sodium aluminate, potassium aluminate, aqueous ammonia, sodium hydroxide and potassium hydroxide; and at least one acidic precursor selected from the group consisting of aluminum sulphate, aluminum chloride, aluminum nitrate, sulfuric acid, hydrochloric acid, and nitric acid, wherein at least one of one of the basic or acidic precursors comprises aluminum, to obtain a boehmite suspension, wherein a) is operated at a temperature of between 5 and 35° C., and wherein the amount of the basic precursor is chosen in order to obtain a pH of end of precipitation in the reaction medium of between 7.5 and 9.5,
   b) filtering and washing the boehmite precipitate obtained in a),
   c) contacting the precipitate obtained in b) with at least one lithium source,
   d) filtering the suspension obtained in c) to obtain a paste,
   e) drying the paste obtained at the end of d) at a temperature of between 20 and 80° C.,
   f) shaping the basic extrusion-mixed dough in which the dried dough resulting from e) is mixed in the presence of an amount of a base between 0.5 and 3% by weight relative to the dry matter, wherein the base is selected from the group consisting of inorganic bases and organic bases in solution, and in which the dough is then subjected to an extrusion, and
   g) hydrothermally treating the dried shaped material obtained at the end of step f), at a temperature of between 50 and 200° C.,
   thereby providing a crystallized solid material of formula $LiX_x.2Al(OH)_3,nH_2O$, wherein n is between 0.01 and 10, and x is equal to 1 when X is an anion selected from the group consisting of chloride, hydroxide and nitrate anions, and x is 0.5 when X is an anion selected from the group consisting of sulfate and carbonate anions.

2. Method according to claim 1, wherein the basic precursor is sodium hydroxide (NaOH).

3. Method according to claim 1, wherein the acidic precursor is aluminum trichloride ($AlCl_3$).

4. Method according to claim 1, wherein a) is carried out at a temperature between 10 and 25° C.

5. Method according to claim 1, wherein the amount of the basic precursor is selected in order to obtain a precipitation end pH of a) in the reaction medium of between 7.7 and 8.8.

6. Method according to claim 1, wherein the source(s) of lithium is/are selected from the group consisting of lithium chloride (LiCl), lithium hydroxide (LiOH) nitrate Lithium ($LiNO_3$), lithium sulphate ($Li_2SO_4$) and lithium carbonate ($Li_2CO_3$), alone or as a mixture.

7. Method according to claim 6, wherein the lithium source is lithium chloride (LiCl).

8. Method according to claim 1, wherein the shaping during f) is carried out in the presence of ammonia.

9. Method according to claim 8, wherein the dried paste is mixed in the presence of an amount of base of between 0.5 and 2.5% by weight relative to the dry matter, wherein the dry matter is the weight of the paste of e), dried in an oven at 200° C. for 6 h in the shaping f).

10. The method according to claim 1, wherein the dry matter of dried dough is defined as the dough resulting from e) dried in an oven at 200° C. for 6 h.

* * * * *